(12) United States Patent
Fattal

(10) Patent No.: US 8,295,632 B2
(45) Date of Patent: Oct. 23, 2012

(54) SYSTEM AND METHOD FOR EDGE-ENHANCEMENT OF DIGITAL IMAGES USING WAVELETS

(75) Inventor: Raanan Fattal, Jerusalem (IL)

(73) Assignee: Yissum Research Development Company of Jerusalem Ltd., Jerusalem (IL)

( * ) Notice: Subject to any disclaimer, the term of this patent is extended or adjusted under 35 U.S.C. 154(b) by 452 days.

(21) Appl. No.: 12/657,503

(22) Filed: Jan. 21, 2010

(65) Prior Publication Data

US 2010/0183222 A1     Jul. 22, 2010

Related U.S. Application Data

(60) Provisional application No. 61/202,022, filed on Jan. 21, 2009.

(51) Int. Cl.
*G06K 9/40* (2006.01)
(52) U.S. Cl. ........ 382/266; 382/268; 382/269; 382/275; 382/263; 382/264; 382/265; 382/274; 382/300
(58) Field of Classification Search .................. 382/266, 382/268, 269, 275, 263, 264, 265, 274, 300
See application file for complete search history.

(56) References Cited

OTHER PUBLICATIONS

Adelson, et al, Pyramid methods in image processing, RCA Engineer 1984.*
C. Tomasi and R. Manduchi, Bilateral Filtering for Gray and Color Images, ICCV 1998.*
* cited by examiner

*Primary Examiner* — Chan S Park
*Assistant Examiner* — Mark Roz
(74) *Attorney, Agent, or Firm* — Lowe Graham Jones PLLC

(57) ABSTRACT

Systems, methods, and techniques are provided for performing any one or more of edge-preserving image sharpening, edge-preserving image smoothing, edge-preserving image dynamic range compression, and edge-aware data interpolation on digital images, wherein a pixel prediction module is adapted for coupling to a memory storing pixel data representative of a digital image and extracts from the image predicted pixel values using robust smoothing. The predicted pixels are stored in a memory and respective detail values equal to the difference between respective original and predicted values are computed. A pixel update module computes approximation values by averaging the respective detail values with original pixel values using robust smoothing, and stores the approximation values for subsequent rendering. The prediction and update modules run recursively and a manipulation module increases or decreases the detail values and the approximation values depending on their magnitude and depending on the kind of edge enhancement required.

13 Claims, 10 Drawing Sheets
(7 of 10 Drawing Sheet(s) Filed in Color)

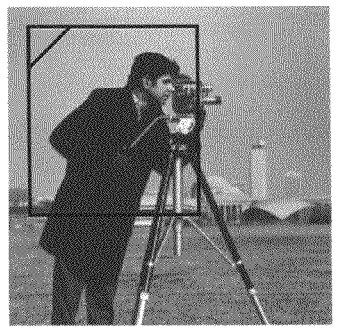 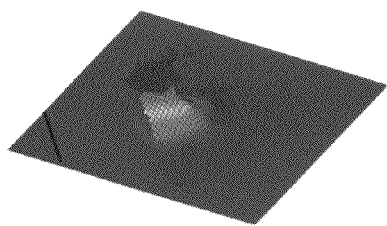 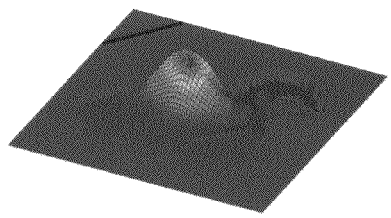
FIG. 1a     FIG. 1b     FIG. 1c
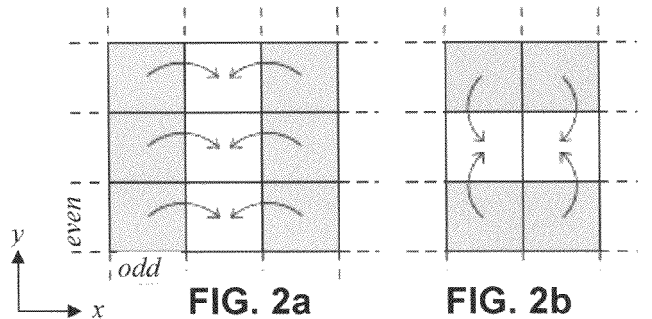
FIG. 2a     FIG. 2b
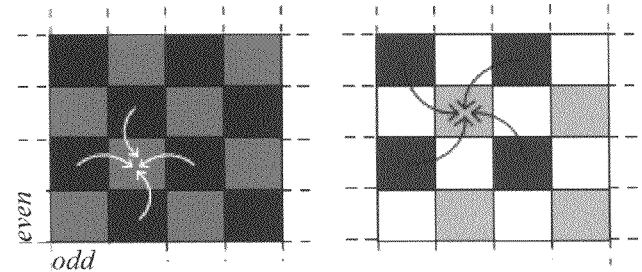
FIG. 2c     FIG. 2d

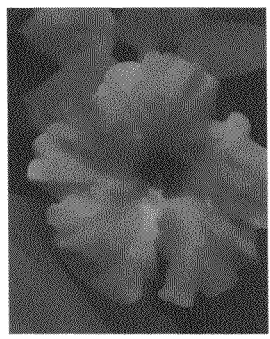
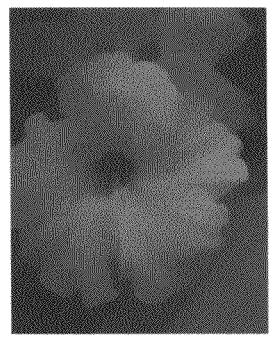
FIG. 7a    FIG. 7b    FIG. 7c
FIG. 7d    FIG. 7e
FIG. 7f    FIG. 7g

SYSTEM AND METHOD FOR EDGE-ENHANCEMENT OF DIGITAL IMAGES USING WAVELETS

CROSS REFERENCE TO RELATED APPLICATIONS

This application claims benefit of provisional application Ser. No. 61/202,022 filed Jan. 21, 2009 whose contents are included herein by reference.

TECHNICAL FIELD

This disclosure relates generally to the field of computer image processing, and more particularly to methods, systems, and techniques for digital image filtering.

BACKGROUND

Several prior references that provide background are listed below and their contents are incorporated herein by reference in their entireties as background information. Additional references are mentioned in the above-referenced U.S. Ser. No. 61/202,022 and their contents are incorporated herein by reference in their entireties.

[1] AN, X., AND PELLACINI, F. 2008. Appprop: all-pairs appearance-space edit propagation. In *ACM SIGGRAPH papers*, ACM, New York, N.Y., USA, 1-9.

[2] BARASH, D., AND COMANICIU, D. 2004. A common framework for nonlinear diffusion, adaptive smoothing, bilateral filtering and mean shift. *Image and Video Computing* 22, 73-81.

[3] BLACK, M. J., SAPIRO, G., MARIMONT, D. H., AND HEEGER, D. 1998. Robust anisotropic diffusion. *Image Processing, IEEE Transactions on* 7, 3, 421-432.

[4] BURRUS, C., GOPINATH, R., AND GUO, H. 1998. *Introduction to Wavelets and Wavelet Transforms, A Primer*. Prentice Hall, N.J.

[5] BURT, P. J., AND ADELSON, E. H. 1983. The laplacian pyramid as a compact image code. *IEEE Transactions on Communications* COM-31, 4, 532-540.

[6] BURT, P. J. 1981. Fast filter transforms for image processing. Proc. SPIE 2825, vol. 16, 396-408.

[7] CHAN, T. F., OSHER, S., AND SHEN, J. 2001. The digital TV filter and nonlinear denoising. *IEEE Trans. Image Process* 10, 231-241.

[8] CHOUDHURY, P., AND TUMBLIN, J. 2005. The trilateral filter for high contrast images and meshes. In *ACM SIGGRAPH Courses*, ACM, New York, N.Y., USA, 5.

[9] COHEN, A., AND MASSON, R. 1999. Wavelet methods for second-order elliptic problems, preconditioning, and adaptivity. *SIAM J. Sci. Comput.* 21, 3, 1006-1026.

[10] COHEN, A., DAUBECHIES, I., AND FEAUVEAU, J. C. 1992. Biorthogonal bases of compactly supported wavelets.

[11] DAHMEN, W. 1994. Some remarks on multiscale transformations, stability and bi-orthogonality. In *Wavelets, Images, and Surface Fitting*, Academic Press, 157-188.

[12] DONOHO, D. L. 1994. On minimum entropy segmentation. Tech. rep., Preprint: Departement of Statistics, Standford University, Stanford, Calif., 1994.

[13] DURAND, F., AND DORSEY, J. 2002. Fast bilateral filtering for the display of high-dynamic-range images. In *ACM SIGGRAPH papers*, ACM, New York, N.Y., USA, 257-266.

[14] FARBMAN, Z., FATTAL, R., LISCHINSKI, D., AND SZELISKI, R. 2008. Edge-preserving decompositions for multi-scale tone and detail manipulation. *ACM Trans. Graph.* 27, 3, 1-10.

[15] FATTAL, R., LISCHINSKI, D., AND WERMAN, M. 2002. Gradient domain high dynamic range compression. In *ACM Trans. Graph.*, ACM, New York, N.Y., USA, 249-256.

[16] FATTAL, R., AGRAWALA, M., AND RUSINKIEWICZ, S. 2007. Multi-scale shape and detail enhancement from multi-light image collections. In *ACM SIGGRAPH papers*, ACM, New York, N.Y., USA, 51.

[17] FATTAL, R., CARROLL, R., AND AGRAWALA, M. 2009. Edge-based image coarsening. Tech. rep., Leibniz Center, Hebrew University, URL http://leibniz.cs.huji.ac.il/tr/1147.pdf.

[18] FATTAL, R. 2008. Single image dehazing. *ACM Trans. Graph.* 27, 3, 1-9.

[19] FINLAYSON, G. D., HORDLEY, S. D., DREW, M. S., AND T J, E. N. 2002. Removing shadows from images. In *In ECCV 2002: European Conference on Computer Vision*, 823-836.

[20] FLEISHMAN, S., DRORI, I., AND COHEN-OR, D. 2003. Bilateral mesh denoising. *ACM Trans. Graph.* 22, 3, 950-953.

[21] GONZALEZ, R. C., AND WOODS, R. E. 2001. Digital Image Processing. Addison-Wesley Longman Publishing Co., Inc., Boston, Mass., USA.

[22] GORTLER, S. J., SCHRÖDER, P., COHEN, M. F., AND HANRAHAN, P. 1993. Wavelet radiosity. In *ACM SIGGRAPH papers*, ACM, New York, N.Y., USA, 221-230.

[23] GORTLER, S. J., GRZESZCZUK, R., SZELISKI, R., AND COHEN, M. F. 1996. The lumigraph. In *ACM SIGGRAPH papers*, ACM, New York, N.Y., USA, 43-54.

[24] HARTEN, A. 1996. Multiresolution representation of data: a general framework. *SIAM J. Numer. Anal.* 33, 3, 1205-1256.

[25] KHAN, E. A., REINHARD, E., FLEMING, R. W., AND BÜLTHOFF, H. H. 2006. Image-based material editing. *ACM Trans. Graph.* 25, 3, 654-663.

[26] LAGENDIJK, R. L., BIEMOND, J., AND BOEKEE, D. E. 1988. Regularized iterative image restoration with ringing reduction. *Acoustics, Speech, and Signal Processing [see also IEEE Transactions on Signal Processing], IEEE Transactions on* 36, 12, 1874-1888.

[27] LEVIN, A., LISCHINSKI, D., AND WEISS, Y. 2004. Colorization using optimization. *ACM Trans. Graph.* 23, 3, 689-694.

[28] LI, Y., SHARAN, L., AND ADELSON, E. H. 2005. Compressing and companding high dynamic range images with subband architectures. *ACM Trans. Graph.* 24, 3, 836-844.

[29] LI, Y., ADELSON, E. H., AND AGARWALA, A. 2008. Scribbleboost: Adding classification to edge-aware interpolation of local image and video adjustments. *Comput. Graph. Forum* 27, 4, 1255-1264.

[30] LISCHINSKI, D., FARBMAN, Z., UYTTENDAELE, M., AND SZELISKI, R. 2006. Interactive local adjustment of tonal values. In *ACM SIGGRAPH papers*, ACM, New York, N.Y., USA, 646-653.

[31] LOUNSBERY, M., DEROSE, T. D., AND WARREN, J. 1997. Multiresolution analysis for surfaces of arbitrary topological type. *ACM Trans. Graph.* 16, 1, 34-73.

[32] MALLAT, S. 1999. *A Wavelet Tour of Signal Processing, Second Edition (Wavelet Analysis & its Applications)*. Academic Press, September.

[33] PARIS, S., AND DURAND, F. 2006. A fast approximation of the bilateral filter using a signal processing approach. In *Proceedings of the European Conference on Computer Vision*, 568-580.

[34] PELLACINI, F., AND LAWRENCE, J. 2007. Appwand: editing measured materials using appearance-driven optimization. In *ACM SIGGRAPH papers*, ACM, New York, N.Y., USA, 54.

[35] PEREZ, P., GANGNET, M., AND BLAKE, A. 2003. Poisson image editing. *ACM Trans. Graph.* 22, 3, 313-318.

[36] PERONA, P., AND MALIK, J. 1990. Scale-space and edge detection using anisotropic diffusion. vol. PAMI-12, 629-639.
[37] PETSCHNIGG, G., SZELISKI, R., AGRAWALA, M., COHEN, M., HOPPE, H., AND TOYAMA, K. 2004. Digital photography with flash and no-flash image pairs. *ACM Trans. Graph.* 23, 3, 664-672.
[38] SCHLICK, C. 1994. Quantization techniques for visualization of high dynamic range pictures. Springer-Verlag, 7-20.
[39] SCHRÖDER, P., AND SWELDENS, W. 1995. Spherical wavelets: efficiently representing functions on the sphere. In *ACM SIGGRAPH papers*, ACM, New York, N.Y., USA, 161-172.
[40] SHEN, J., JIN, X., ZHOU, C., AND WANG, C. C. L. 2007. Technical section: Gradient based image completion by solving the Poisson equation. *Comput. Graph.* 31, 1, 119-126.
[41] SORKINE, O., COHEN-OR, D., LIPMAN, Y., ALEXA, M., RÖSSL, C., AND SEIDEL, H.-P. 2004. Laplacian surface editing. In SGP '04: *Proceedings of the 2004 Eurographics/ACM SIGGRAPH symposium on Geometry processing*, ACM, New York, N.Y., USA, 175-184.
[42] SUN, J., JIA, J., TANG, C.-K., AND SHUM, H.-Y. 2004. Poisson matting. In *ACM SIGGRAPH papers*, ACM, New York, N.Y., USA, 315-321.
[43] SWELDENS, W. 1995. The lifting scheme: A new philosophy in biorthogonal wavelet constructions. In in *Wavelet Applications in Signal and Image Processing III*, 68-79.
[44] SWELDENS, W. 1998. The lifting scheme: a construction of second generation wavelets. *SIAM J. Math. Anal.* 29, 2, 511-546.
[45] SZELISKI, R. 2006. Locally adapted hierarchical basis preconditioning. In *ACM SIGGRAPH papers*, ACM, New York, N.Y., USA, 1135-1143.
[46] TOMASI, C., AND MANDUCHI, R. 1998. Bilateral filtering for gray and color images. In *ICCV '98: Proceedings of the Sixth International Conference on Computer Vision*, IEEE Computer Society, Washington, D.C., USA, 839.
[47] TUMBLIN, J., AND TURK, G. 1999. Lcis: a boundary hierarchy for detail-preserving contrast reduction. In *ACM SIGGRAPH papers*, ACM Press/Addison-Wesley Publishing Co., New York, N.Y., USA, 83-90.
[48] UYTTERHOEVEN, G., ROOSE, D., AND BULTHEEL, A. 1999. Integer wavelet transforms using the lifting scheme. World Scientific and Engineering Society Press, 198-200.
[49] WEISS, Y. 2001. Deriving intrinsic images from image sequences. *Computer Vision, IEEE International Conference on* 2, 68.

Filtering lies behind almost every operation on digital images. Explicit linear translation-invariant (LTI) filtering, i.e., convolution, is used extensively in a wide range of applications which include noise removal, resolution enhancement and reduction, blurring and sharpening, edge detection, and image compression [Gonzalez and Woods 2001]. Data-dependent filtering with, e.g., the bilateral filter [Tomasi and Manduchi 1998], adjusts filter stencils at each pixel based on the pixel's surrounding. In this robust filtering, pixels across edges are not averaged together, thereby avoiding edge-related halo artifacts that plague many image operations that rely on LTI filtering. In addition, switching to such data-dependent filtering requires little or no further algorithmic modifications, making it very poplar in computational photography.

Both the LTI and data-dependent filtering can be used in implicit formulations, where the unknown image appears convolved, allowing images to be defined through their filtering. The gradient domain [Weiss 2001; Fattal et al. 2002; Pérez et al. 2003] processing, where images are computed from their derivatives, is one popular example for implicit translation-invariant filtering. This approach provides a transparent way of manipulating edges in the image without worrying about the global adjustments involved, but comes at the cost of solving a Poisson equation. As discussed below, the inhomogeneous Laplace and Poisson equations can be interpreted as an implicit formulation of data-dependent filtering in which requirements over the image derivatives are weighted based on the input datum. These formulations prove to be useful for edge-aware interpolation of sparse user input and as high-quality edge-preserving smoothing operators, but require solving poorly conditioned systems of equations.

Multi-resolution analysis (MRA) via wavelet transform [Burrus et al. 1998; Mallat 1999] is widely known as an extremely effective and efficient tool for LTI multi-scale decomposition and processing which provides a good localization trade-off in space and frequency. More specifically, efficient filtering with effective kernel size proportional to the image dimensions [Burt 1981], detecting edges both in space and scale [Burt and Adelson 1983], bypassing the need for implicit LTI formulations and avoiding the associated costs of solving large linear systems [Li et al. 2005], and preconditioning these systems [Cohen and Masson 1999], are all achieved in linear-time computations. In contrast to these results, data-dependent filtering requires performing $O(N \log N)$ operations in the number of image pixels N since subsampling is avoided [Fattal et al. 2007], solving multiple linear systems [Farbman et al. 2008], coping with the resulting poorly-conditioned systems [Szeliski 2006], or introducing additional dimensions and their discretization [Paris and Durand 2006].

Explicit LTI filtering is used in numerous image processing applications, see [Gonzalez and Woods 2001] for a good survey. Implicit formulations allow one to define the image through its filtering, e.g., the derivatives, and require solving systems of linear equations, e.g., Poisson equation. This is used for shadow removal [Weiss 2001; Finlayson et al. 2002], dynamic-range compression [Fattal et al. 2002], seamless image editing [Pérez et al. 2003], image completion [Shen et al. 2007], alpha matting [Sun et al. 2004], and surface editing [Sorkine et al. 2004].

Data-dependent filtering such as the bilateral filter [Tomasi and Manduchi 1998] adjusts the weight of each pixel based on its distance, both in space and intensity, from the center pixel. This operation is not linear and does not correspond to filtering in the strict sense of the word; however it serves the same purpose as its linear counterpart: both operations target the data through a prescribed localization in space and frequency, i.e., they can blur the image or extract its fine-scale detail. Other prototypical approaches for data-dependent filtering include anisotropic diffusion [Perona and Malik 1990], robust smoothing [Black et al. 1998], and digital total variation [Chan et al. 2001]. In the past two decades or so, these filters became very popular for their ability to smooth an image while keeping its salient edges intact, and are known as edge-preserving smoothing filters. One of the main advantages of this property is avoiding the well-known halo artifacts which are typical to image operations that rely on linear filtering. Edge-preserving smoothing is used in numerous computational photography applications such as smoothing color images [Tomasi and Manduchi 1998], edge-preserving noise removal [Chan et al. 2001; Choudhury and Tumblin 2005], dynamic-range compression [Tumblin and Turk 1999; Durand and Dorsey 2002], flash and no-flash photography [Petschnigg et al. 2004], image editing [Khan et al. 2006], and mesh denoising [Fleishman et al. 2003].

Data-dependent filtering also has an implicit counterpart, the inhomogeneous Laplace and Poisson equations. As shown in [Farbman et al. 2008], the inhomogeneous Poisson equation expresses the steady-state condition of linear anisotropic diffusion processes and therefore acts as an edge-preserving smoothing operator. Much like the analogy between LTI filtering and Poisson-based image generation, the inhomogeneous Laplace and Poisson equations compute a least squares solution over weighted image derivatives [Farbman et al. 2008] and can therefore be regarded as a weighted filtering of the output image. This is used also for regulating deblurring operation of noisy images [Lagendijk et al. 1988], manipulating the detail and contrast of images [Farbman et al. 2008], and regulating estimated transmission in hazy scenes [Fattal 2008]. A similar formalism is used for image colorization [Levin et al. 2004] and tonal adjustment [Lischinski et al. 2006] methods, where sparse user strokes of color or adjustment parameters are propagated across the image in an edge-aware fashion. This results in a spatially-dependent Laplace equation and as used for other applications such as material [Pellacini and Lawrence 2007] and appearance [An and Pellacini 2008] editing, and in [Li et al. 2008] this edge-aware interpolation is boosted via a classification step.

Traditional MRA [Mallat 1999; Burrus et al. 1998] is, in its essence, a linear translation-invariant filtering. This results from a uniform notion of smoothness throughout space, defined by a single pair of scaling and wavelet functions, and reveals itself as the convolution in the wavelet transform equations. While this analysis excels in separating weak variations based on their scale, it fails to isolate large-magnitude jumps in the data such as the ones encountered across edges. As indicated in previous reports [Schlick 1994; Tumblin and Turk 1999; Li et al. 2005; Farbman et al. 2008], strong edges respond to filters at several scales thus producing multiple 'reads' in multi-scale decomposition. Processing the different scales independently often violates the delicate relationships within this multiplicity and results in haloing and other artifacts around strong edges in the reconstructed image [Tumblin and Turk 1999]. Avoiding these artifacts, in the framework of LTI decompositions, requires taking special precautions when processing the different bands [Li et al. 2005].

Very recently, several multi-scale constructions have been proposed in the context of data-dependent image filtering. Paris et al. [2006] exploit the facts that the bilateral filter is an LTI filter in the extended neighborhood, consisting of space and pixel-intensity range [Barash and Comaniciu 2004] and that linear filtering can be computed efficiently through a multi-level strategy [Burt 1981], to achieve a linear-time implementation of bilateral filtering with arbitrarily large kernels. This comes at a storage cost where an additional dimension (intensity range) must be discretized (or three in case of color images). A multi-scale decomposition, based on the dyadic wavelet transform [Mallat 1999] and bilateral filter, is proposed in [Fattal et al. 2007] and operates in O(N logN) time. This decomposition runs the bilateral filter repeatedly and results in oversharpened edges that persist in the coarsest scales. This may lead to gradient reversals when used for image processing [Farbman et al. 2008]. Farbman et al. [2008] show that the weighted least squares, i.e., inhomogeneous Poisson equation, can be used for computing edge-preserving smoothing at multiple scales. This approach requires solving large numerically-challenging linear systems for each scale. Szeliski proposes a locally-adapted hierarchical basis for preconditioning this type of linear systems. More recently, Fattal et al. [2009] propose an adaptive edge-based image coarsening for tone-mapping operations. In this approach the image is represented by fewer degrees of freedom than the original number of pixels. While it avoids certain bleeding artifacts, this reduced representation supports a limited number of image operations. For example, it does not provide a scale separation and cannot be used to manipulate image details.

SUMMARY

According to a first aspect, there is provided a system for performing any one or more of edge-preserving image sharpening, edge-preserving image smoothing, edge-preserving image dynamic range compression, and edge-aware data interpolation on digital images, the system comprising:

a robust smoothing module configured to compute weighted averages of pixel values that gives more weight to pixels that are close in spatial distance and color attributes to the pixel being predicted than to distant pixels with different color attributes, a pixel prediction module coupled to the robust smoothing module and adapted for coupling to a memory storing pixel data representative of a digital image and configured to extract from said image predicted pixel values using robust smoothing, and to store in said memory a respective detail value equal to the difference between respective original and predicted values, a pixel update module coupled to the robust smoothing module and configured to compute approximation values by averaging the respective detail values with original pixel values using robust smoothing, and to store the approximation values, a multi-scale module that runs the prediction and update modules recursively by operating on the approximation values, and a manipulation module that increases or decreases the detail and approximation values depending on their magnitude and depending on whether edge-preserving image sharpening or edge-preserving image smoothing or edge-preserving image dynamic range compression or edge-aware data interpolation is to be performed.

According to a second aspect, there is provided a computer-implemented method for performing any one or more of edge-preserving image sharpening, edge-preserving image smoothing, edge-preserving image dynamic range compression, and edge-aware data interpolation on digital images, the method comprising:

computing forward transformation of pixels in said image by:
  predicting from pixel data representative of a digital image predicted pixel values using robust smoothing by computing weighted averages of pixel values that gives more weight to pixels that are close in spatial distance and color attributes to the pixel being predicted than to distant pixels with different color attributes, and storing in a memory detail values each equal to a respective difference between an original and predicted value;
  updating the pixel values by averaging the respective detail values with original pixel values using robust smoothing by computing weighted averages of pixel values that gives more weight to pixels that are close in spatial distance and color attributes to the pixel being predicted than to distant pixels with different color attributes so as to compute approximation values, and storing the approximation values;
  subsampling by copying a portion of the approximation values to a coarser grid having fewer pixels than said portion;
repeating the forward transformation recursively in respect of newly computed approximation values;

increasing or decreasing the detail values and the approximation values depending on their magnitude and depending on whether edge-preserving image sharpening or edge-preserving image smoothing or edge-preserving image dynamic range compression or edge-aware data interpolation is to be performed;

computing backward transformation of the approximation values and the detail values by:

upsampling the approximation values by copying the approximation values to a finer grid having more pixels than the number of approximation values;

predicting from the approximation values predicted pixel values in respect of those pixels that are missing in the finer grid using robust smoothing; and updating the pixels values by summing the respective detail values and the predicted pixel values using robust smoothing; and repeating the backward transformation recursively in respect of newly computed approximation values.

The present disclosure proposes new data-dependent second-generation wavelets [Sweldens 1998] based on the edge content of an image. FIGS. 1b and 1c show two 3D views of the same edge-avoiding wavelet centered at the shoulder of the Cameraman shown in FIG. 1a. This construction uses ideas from data-dependent filtering, mentioned above, to design wavelets with a support that is confined within the limits set by the strong edges around the upper body and does not contain pixels from both sides of an edge. This achieves multi-scale decompositions with a diminished response to strong edges at the transformed coordinates. This reduced inter-scale correlation allows us to avoid halo artifacts in band-independent multi-scale processing without taking any special precautions, as in [Li et al. 2005]. The new wavelets encode, in their shape, the edge structure of the image at every scale. We use this to implement edge-aware interpolation, which is typically achieved via implicit data-dependent formulations, at the cost of performing two transforms and their inverse. This allows us to avoid the need of solving numerically-challenging linear systems arising from inhomogeneous Laplace and Poisson equations. Altogether, this construction allows us to achieve nonlinear data-dependent multi-scale decomposition and processing through explicit computations running in linear time O(N) just as in the case of LTI filtering. We demonstrate the effectiveness of this new MRA on various computational photography applications such as multi-scale dynamic range compression, edge-preserving smoothing and detail enhancement, and image colorization.

Second-Generation Wavelets

Wavelet constructions that do not rely on translates of a single pair of scaling and wavelet functions, varying them according to local spatial particularities, exist [Dahmen 1994; Donoho 1994; Schröder and Sweldens 1995; Lounsbery et al. 1997; Sweldens 1998], and are known as second-generation wavelets [Sweldens 1998]. These constructions are used for coping with irregular sampling, constructing MRA over complicated domains, adapting wavelets on finite intervals to the boundary, and refining unstructured meshes. In contrast thereto, the present disclosure constructs wavelets that depend on the content of the input datum by borrowing ideas from robust smoothing. The new enhanced construction scheme builds on data prediction schemes by Harten [1996] and the wavelet lifting scheme by Sweldens [1995] which we briefly describe here.

Lifting Scheme. The lifting scheme is a methodology for constructing bi-orthogonal wavelets through space, without the aid of Fourier transform. This makes it a well-suited framework for constructing second-generation wavelets that adapt to the spatial particularities of the data. In this construction one starts-off with some given, simple and often translation-invariant, biorthogonal basis and performs a sequence of modifications that adapt and improve the wavelets. This scheme can be divided into three construction steps: split, predict, and update. Split. Given the input signal data at the finest level $a^0[n]$, where the superscripts denote the level, the split step consists of formally dividing the data variables $a^0[n]$ into two disjoint sets C and F, which define coarse and fine data points. We denote the signal values restricted to these sets by $a_C^0[n]$ and $a_F^0[n]$ (but keep the same index numbering n). This operation is known as Lazy wavelet transform and a simple and popular choice, in 1D, is splitting the data into the sets of even and odd grid points. Predict. Next, we use the coarse data points $a_C^0$ to predict the fine $a_F^0$. Denote this prediction operator by $\wp: C \to F$, and define the prediction error by $$d^1[n] = a_F^0[n] - \wp(a_C^0)[n], \qquad (1)$$

at every $n \in F$. This abstract form obscures the fact that the coarse and fine variables are intermixed in space and every fine variable $a_F^0[n]$ has a few neighboring variables within $a_C^0$ that are relevant for its prediction, assuming, of course, local correlations in the image. The prediction errors $d^1[n]$, $n \in F$ are the wavelet or detail coefficients of the wavelet transform (see the Appendix), of the next level. Update. The coarse variables $a_C^j[n]$ are normally not taken as the next-level approximation coefficients, since it would correspond to a naïve subsampling of the original data and may suffer severe aliasing. Typically, the lifting scheme makes sure that the overall sum of the approximation coefficients $\Sigma_n a^j[n]$ is preserved at all levels. This is achieved by an additional update operator $U: F \to C$ that introduces averaging with the fine variables $a_F^0$ through $d^1$, i.e, $$a^1[n] = a_C^0[n] + U(d^1)[n], \qquad (2)$$

at every $n \in C$. These new variables $a^1[n]$ are the approximation coefficients of the next level of the wavelet transform, which is now complete. As in the traditional MRA, the following levels are computed recursively by repeating these three steps over the approximation coefficients $a^j[n], j \geq 1$. It is easy to see that by applying these steps in the reverse order and replacing additions with subtractions and vice versa, the prefect-reconstructing inverse transform is obtained.

To make this construction more concrete, we will describe a particular example, taken from [Sweldens 1995], which we use as a starting point for our new scheme in the detailed description below. Consider a 1D image signal $a^0[n]$ and the splitting step that takes the odd-indexed pixels as the coarse variables and the even-indexed as the fine. Every even-indexed pixel is predicted by its two odd-indexed neighbors using a simple linear interpolation formula $$\wp(a_C^0)[n] = (a_C^0[n-1] + a_C^0[n+1])/2 \qquad (3)$$

for every $n \in F$ (even), thus $n-1, n+1 \in C$ (odd). Next, by choosing the following update operator $$U(d^1)[n] = (d^1[n-1] + d^1[n+1])/4 \qquad (4)$$

defined over n defined over $n \in C$, the approximation average is preserved throughout the different levels [Sweldens 1995]. This construction corresponds to the (2,2)-Cohen-Daubechies-Feauveau (CDF) biorthogonal wavelets [Cohen et al. 1992] where both the primal and dual wavelets have two vanishing moments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to understand this disclosure and to see how it may be carried out in practice, embodiments will now be described, by way of non-limiting example only, with reference to the accompanying drawings, in which:

FIGS. 1b and 1c show two 3D views of the same edge-avoiding wavelet centered at the shoulder of the Cameraman shown in FIG. 1a;

FIGS. 2a to 2d are schematic representations of pixel arrays showing wavelet prediction schemes according to example embodiments;

FIGS. 7a to 7g compare edge-preserving gradients according to example embodiments of the present disclosure with corresponding results of prior art approaches;

DETAILED DESCRIPTION

Figure 3A:
FIGS. 3a to 3d show pictorially different coarse-level (dual) scaling functions obtained by the Weighted Red-Black (WRB) construction of example embodiments.

While many existing constructions of second generation wavelets depend upon the irregularities and inhomogeneities of the domain, the method according to example embodiments of the present disclosure constructs the scaling and wavelet functions based on the content of the input data. Motivated by robust smoothing [Perona and Malik 1990; Tomasi and Manduchi 1998; Black et al. 1998], we avoid mixing pixels that differ considerably. This is implemented in the context of lifting by defining robust prediction operators that weigh pixels based on their similarity to the predicted pixel. Thus, instead of using data-independent regression formulae, we use posteriori influence functions based on the similarity between the predicted pixel and its neighboring coarse variables. More specifically, we use the edge-stopping function in [Lischinski et al. 2006] to define the following prediction weights $$w_n^j[m] = (|a^j[n] - a^j[m]|^\alpha + \epsilon)^{-1} \quad (5)$$

where $\alpha$ is between 0.8 and 1.2 and $\epsilon = 10^{-5}$, for images with pixels values ranging between zero and one. We use these weights to derive two different two-dimensional wavelet constructions.

Weighted CDF Wavelets (WCDF)

Here we derive a two-dimensional weighted prediction based on the (2,2)-CDF wavelet transform, applied along each axis separately. Instead of using even average of the two coarse variables, we define a robust average by $$\wp(a_C^j)[x,y] = \frac{w_{x,y}^j[x-1,y]a_C^j[x-1,y] + w_{x,y}^j[x+1,y]a_C^j[x+1,y]}{w_{x,y}^j[x-1,y] + w_{x,y}^j[x+1,y]} \quad (6)$$

where, like in the 1D case and as shown in FIGS. 2a-2d, F={(x, y)|x even} (white cells) and C={(x, y)|x odd} (gray cells). The next-level detail coefficients are computed by $d^{j+1} = a_F^k - \wp(a_C^j)$ over the fine points. The update operator U is designed to smooth the next-level approximation variables $a_C^{j+1}$ when possible and, once again, we use a robust smoothing to define $$U(d^{j+1})[x,y] = \frac{w_{x,y}^j[x-1,y]d^{j+1}[x-1,y] + w_{x,y}^j[x+1,y]d^{j+1}[x+1,y]}{2(w_{x,y}^j[x-1,y] + w_{x,y}^j[x+1,y])} \quad (7)$$

where (x, y)∈C. The next-level approximation coefficients are computed by $a^{j+1} = a_C^j + U(d^{j+1})$ at the coarse points. The analog steps are repeated along the y-image axis. Note that uniform weights, i.e., $\alpha=0$ in (5), produce a separable two-dimensional (2,2)-CDF wavelet transform.

Weighted Red-Black Wavelets (WRB)

FIGS. 2a to 2d are schematic representations of pixel arrays showing wavelet prediction schemes according to one embodiment of the present disclosure. Here we construct non-separable wavelets of a lower anisotropy based on the data-independent LTI construction by Uytterhoeven et al. [1999]. This is also a two-step construction that uses the red-black quincunx lattice. At the first step shown in FIG. 2c we predict each red pixel by the following weighted averages of its four nearest black pixels $$\wp_{red}(a_C^j)[x,y] = \frac{\sum_{x',y' \in N_{x,y}} w_{x,y}^j[x',y']a_C^j[x',y']}{\sum_{x',y' \in N_{x,y}} w_{x,y}^j[x',y']} \quad (8)$$

where C={(x, y)|x+y even} (black pixels), F={(x, y)|x+y odd} (red pixels) and Nx,y={(x+1,y), (x−1,y), (x, y−1), (x, y+1)}. The update operator is also defined by averaging the four nearest fine points of every coarse point $$U_{red}(d^{j+1})[x, y] = \frac{\sum_{x',y' \in N_{x,y}} w^j_{x,y}[x', y']d^{j+1}[x', y']}{2 \sum_{x',y' \in N_{x,y}} w^j_{x,y}[x', y']} \quad (9)$$

for $(x, y) \in C$ and as before, the detail coefficients are computed by $d^{j+1} = a_F^j - \wp(a_C^j)$.

In the second step, illustrated in FIG. 2d, we predict the light-gray variables of even coordinates based on their four diagonally-nearest dark-gray neighbors of odd co-ordinates. The prediction formula for $\wp(a_C^j)[x,y]$ is the same as (8) with C'={(x, y)|x+y even, and x, y odd} (dark-gray pixels), F'={(x, y)|x+y even, and x, y even} (light-gray pixels), and $N_{x,y}$= {(x+1,y+1), (x−1,y+1), (x+1, y−1), (x−1, y−1)}. Based on this prediction we compute $d^{j+1} = a_F^j - \wp(a_C^j)$ at every (x, y)∈F'. The update operator $U_{black}$ averages at each (x, y)∈C' its four diagonally nearest $d^{j+1}$ in F' according to (9) and gives the final next-level approximation coefficients $a^{j+1}$. Note that uniform weights, i.e., $\alpha=0$ in (5), recover the red-black wavelet transformation of [Uytterhoeven et al. 1999].

In both of these constructions treating the boundary is, typically to the lifting scheme, very easy. The prediction and update operators (8) and (9) remain properly normalized. We should note that although we started with schemes that preserve the approximation average at all scales, this property is lost once weighted averaging is introduced. However, constant images produce uniform weights which reproduce the original (2,2)-CDF and red-black schemes and thus preserve the approximation averages at all scales. When transforming general one-megapixel images we observe that the fluctuations in the approximation average are below 4%.

Discussion

Figure 3B:
Figure 3C:
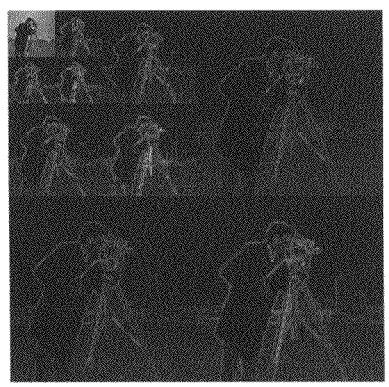
Figure 3D:

FIGS. 3a to 3d show pictorially different coarse-level (dual) scaling functions obtained by the Weighted Red-Black (WRB) construction of example embodiments of the present disclosure. FIG. 3a shows an input image; FIG. 3b shows a few dual WRB scaling functions $\tilde{\phi}^3$ shown with unique colors; FIG. 3c shows the translation-invariant red-black wavelet transform, and FIG. 3c shows the weighted red-black wavelet transform (computed with $\alpha=0.8$). These functions are smooth where the input image is flat, resembling the original profiles of the LTI red-black scaling function of [Uytterhoeven et al. 1999]. Near edges, however, they terminate abruptly, depending on $\alpha$ in (5), and their support avoids both the edge and pixels past it. Since the wavelets are made of a linear combination of scaling functions, see (25), they inherit these structural properties, as shown in FIGS. 1b and 1c. For this reason, we call these new wavelets edge-avoiding wavelets (EAW). The decoupling between scaling functions across edges allows representing such discontinuities in the data using the scaling functions (i.e., such discontinuous functions are well represented in the approximation spaces $V^j$, as used in traditional MRA). As a consequence, the wavelets' response to edges diminishes and, with it, the inter-scale correlations of the detail coefficients. The latter, as we discussed earlier, is the major source of haloing effects in LTI-based operations.

While we will show how this decorrelation or compaction of edge response is useful for image manipulation, it is useless for image compression. The 'separation data,' i.e., the different shapes of the edge-avoiding scaling and wavelet functions are encoded in the averaging weights used in the prediction and update formulae (or alternatively, in the spatially-changing conjugate mirror filters). This data must be stored, along with the detail and approximation coefficients, during the forward transform since it is required for computing the inverse.

The work by Donoho [1994] tries to achieve a similar goal as our construction finding a multi-scale representation with low interscale correlations. In his work, images are segmented into regions which are analyzed through an independent multi-scale average-interpolation scheme. In our construction, regions separated by an edge are not completely isolated; this is done smoothly according to the edge magnitude and spread. This is preferable for image processing since segmentation-based manipulations are known to produce gradient reversals artifacts [Farbman et al. 2008]. As we shall show in the next section, this makes our construction useful for edge-aware interpolation where, up to a certain extent, data needs to propagate through edges.

Applications

We implemented both the WCDF and WRB wavelet transformation and the following applications in C++ and report their running times on a 3.0 GHz Intel™ Core 2 Duo machine. Our main goal here is to describe how various computational-photography applications can be implemented using the EAW decomposition in a natural and conceptually-simple way, verify the quality of the results against state-of-the-art methods on previously-tested images, and measure the computational performance.

Dynamic-Range Compression

High-dynamic range imaging has become popular in recent years and digital cameras are producing more significant bits per pixel than ever before. Displaying and printing these images on conventional media require reducing the range of their luma. This is the subject of many recent papers in the field, including [Tumblin and Turk 1999; Durand and Dorsey 2002; Fattal et al. 2002; Li et al. 2005; Lischinski et al. 2006; Farbman et al. 2008].

Using the EAW decomposition according to the example embodiments as described we can achieve detail-preserving dynamic-range compression by 'flattening' the approximation coefficients $a^J$ at the coarsest level J as well as progressively the detail coefficients $d^j$; more at the coarse scales and less at the fine scales. More specifically, we switch to the YUV color space, and operate on the logarithm of the luma channel Y(x, y). Given its EAW decomposition $\log Y \to a^J, \{d^j\}_{j=1}^J$, we compute a dynamically-compressed luma component Y'(x, y) simply by scaling the different components before reconstruction, i.e., $$\beta a^J, \{\gamma^j d^j\}_{j=1}^J \to \log Y'(x,y) \quad (10)$$

where $\beta \leq 1$ and $\gamma \leq 1$ are the parameters controlling the amount of compression and $\to$ refers to the forward- and backward-wavelet transform.

Figure 4A:
FIGS. 4a and 4b show prior art results compared with the results according to example embodiments of the present disclosure shown in FIG. 4c.
Figure 4B:
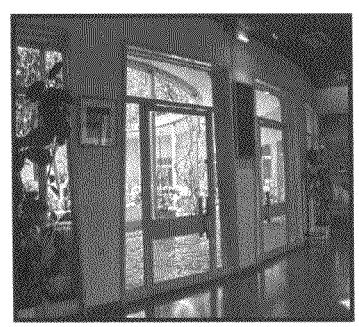
Figure 4C:
Figure 5A:
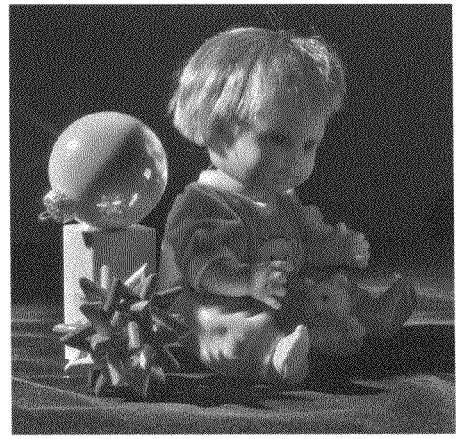
FIG. 5a shows prior art results compared with the results according to example embodiments of the present disclosure shown in FIG. 5b.
Figure 5B:

In FIG. 4c we compare our results to the ones obtained by current state-of-the-art is methods [Durand and Dorsey 2002] and [Farbman et al. 2008] shown in FIGS. 4a and 4b respectively. This comparison shows that the image quality produced by the EAW-based compression (with $\alpha=0.8$, $\beta=0.15$, and $\gamma=0.7$) does not fall below the two alternatives and no visual artifacts are observed at this strong level of compression. Using our implementation, it takes 12 milliseconds to compress the dynamic range of one-megapixel image. This is more than 200 times faster than [Farbman et al. 2008] which requires 3.5 seconds on a 2.2 GHz machine and about five times faster than the single-scale compression of [Durand and Dorsey 2002]. FIGS. 5a and 5b shows that even without taking any special precautions during compression in (10), such as smoothing the gain control by Li et al. [2005], the EAW-based compression of example embodiments of the present disclosure (with α=0.8, β=0.11, and γ=0.68) produces halo-free images.

Multi-Scale Detail Enhancement and Edge-Preserving Smoothing

Detail enhancement and smoothing are basic and common image processing operations, available in most image editing software. Recently, several new approaches were proposed for performing these operations while keeping the strong edges in tact and avoiding halo and gradient-reversal artifacts. Here we show that these operations can be achieved in a simple and efficient way using our new MRA while producing results that meet the quality standards set by latest state-of-the-art methods.

Figure 6A:
FIGS. 6a and 6b show prior art results compared with the results according to example embodiments of the present disclosure shown in FIG. 6c.
Figure 6B:
Figure 6C:

Both the smoothing and enhancement are achieved by an operation similar to the one we used to compress images. We transform the logarithm of the luma component of the input image and reconstruct the image according to (10) with β=1 and $\{\gamma^j\}_{j=1}^J$ determined by a cubic polynomial p(j). This polynomial interpolates between the amount of enhancement we want at the finest-scale p(1), the mid-scale p(J/2), and the coarsest-scale p(J) which are values set by the user. Smoothing is achieved by setting a small p(1), whereas enhancing fine-scale detail is achieved with a large p(1) and a mid-scale enhancement is obtained with a large p(J/2). In FIG. 6c we compare our method (using α=1) with [Fattal et al. 2007] and [Farbman et al. 2008] shown in FIGS. 6a and 6b, respectively. The mountain blow-ups inset into the figures show the artifacts due to gradient-reversals in the multi-scale bilateral filter. This test shows that our output is halo-free with an increased fine-scale detail and does not show the gradient-reversals seen in the result of [Fattal et al. 2007]. FIG. 7 shows edge-preserving smoothing at two different scales as well as another comparison with Farbman et al. [2008] where we boost details at two different scales. FIG. 7a shows the input image; FIGS. 7b and 7c show edge-preserving smoothing using WRB wavelets at two different scales, FIGS. 7d and 7f show edge-preserving detail enhancement at two scales by Farbman et al. [2008], while FIGS. 7e and 7g show the results by our WRB edge-avoiding wavelets (with α=1). While we get comparable results, our method is much faster to compute, even compared to Fattal et al. [2007] which computes every scale of a one-megapixel image, in 15 milliseconds. One-megapixel image has about 7-8 relevant scales, thus there is about a one order of magnitude time factor between the multi-scale bilateral filter and using our O(N) EAW transform which computes all scales in 12 milliseconds.

Edge-Aware Interpolation

Optimization-based edge-aware interpolation has become a very popular tool in computational photography [Levin et al. 2004; Lischinski et al. 2006; Pellacini and Lawrence 2007; An and Pellacini 2008; Li et al. 2008]. Typically it requires solving inhomogeneous Laplace equations with the user input defining non-trivial boundary conditions. These matrices are large (N-by-N) and poorly-conditioned due to the presence of weak and strong inter-pixel connections and require preconditioning [Szeliski 2006]. Here we propose to use EAW for edge-aware interpolation without the need to solve numerically-challenging large linear systems altogether. We use the ideas in [Gortler et al. 1993] and [Gortler et al. 1996] to derive a pull-push mechanism using our EAW. Edge-aware interpolation means that pixels which are not separated by an edge should exchange information and vice versa. In the EAW construction according to example embodiments of the present disclosure, pixels not separated by an edge belong at some scale to the support of the same scaling function. Thus, we can 'pull' information from a particular such pixel (x, y) by computing the dot-product $\langle e_{x,y}, \phi \rangle$, where $e_{x,y}(x',y')=I(x,y)$ if x=x' and y=y' and zero otherwise, and φ is the scaling function that φ(x, y)>0. The action of 'pushing' the information corresponds to $\phi \langle e_{x,y}, \phi \rangle$, i.e., sending all the pixels in the support of φ the value I(x, y). The pull step gathers data from pixels that are not separated by an edge, i.e., belong to the support of the same scaling function. And the push step spreads this averaged information to all of these pixels. Two pixels separated by a strong edge will not communicate in this process since there is no scaling function containing both of them in its support. The general form of this operation is given by $$\bar{I}(x, y) = \sum_{j=1}^{J} \sum_{\tilde{\phi} \in \tilde{V}^j} 2^{-j} \tilde{\phi}(x, y) \langle I(x, y), \tilde{\phi}^j(x, y) \rangle \quad (11)$$

where the second summation is over all the scaling functions at level j. The factor $2^{-j}$ is meant to prefer information coming from short-range connections over large-range connectivity; allowing closer pixels to have a stronger effect than farther ones. Note that we use the dual scaling function $\tilde{\phi}$ rather than the primal φ, since both in the WCDF and WRB constructions the dual scaling functions are non-negative (while the φs have negative values).

In practice we need to compute the approximation coefficients based on φ and do not need to compute the detail coefficients since wavelets do not appear in (11). This is implemented by performing only the update steps of the lifting scheme and discarding the pixels where the detail coefficients should have been stored. The dual update operators of the weighted CDF and weighted red-black wavelets define the contribution of a single approximation variable at one scale to the approximation variables of the next scale. By analyzing this contribution we can write down the WCDF dual update operator $$\tilde{U}(a^j)[x,y] = \hat{w}_{x-1,y}^j [x,y] a^j [x-1,y] + \hat{w}_{x+1,y}^j [x,y] a^j [x+1,y] \quad (12)$$

for (x, y)∈C={(x, y)|x odd}, where the normalized weights $\hat{w}_{x,y}^j(x\pm 1,y) = w_{x,y}^j(x\pm 1,y)/w_{x,y}^j[x+1,y]+w_{x,y}^j[x-1,y]$. For the first WRB step we get $$\tilde{U}_{red}(a^j)[x, y] = \sum_{x',y' \in N_{x,y}} \hat{w}_{x',y'}^j [x, y] a^j [x', y'] \quad (13)$$

for (x, y)∈C={(x, y)|x+y even}, the neighborhood $N_{x,y}$ consists of the four nearest black pixels, as in (8), and $$\hat{w}_{x,y}^j [x', y'] = w_{x,y}^j [x', y'] / \sum_{x',y' \in N_{x,y}} w_{x,y}^j [x', y'].$$

And at the second WRB step we get the same as (13) for (x, y)∈C'={(x, y)|x+y even, and x, y odd} and the neighborhood $N_{x,y}$={(x+1,y+1), (x−1,y+1), (x+1, y−1), (x−1, y−1)}.

Image Colorization

We demonstrate the effectiveness of this approach and its ability to produce solutions that are similar to the ones computed via inhomogeneous Laplace equations with image colorization [Levin et al. 2004]. Here, given an input grayscale image Y(x, y) and color user-stroke images U(x, y) and V(x, y), all given in the YUV color coordinates, we wish to interpolate the color information based on Y's edge content. We do so by introducing a normalization function N(x, y) which is defined to be one at pixels where there is a user input, i.e., U(x, y)≠0 and V(x, y)≠0, and zero otherwise. This function allows us to keep track of how much color has propagated to each pixel in the image and normalize it accordingly. The exact image colorization procedure using EAW is given by the following pseudo-code lines, which basically implement (11).

1. Given Y, we compute the robust averaging weights of WCDF or WRB wavelets (which basically define $\bar{\phi}$), simply by running the forward transform and keeping these weights recorded. The resulting approximation and detail coefficients are discarded.
2. Use these weights in equations (12) or (13) to compute only the approximation coefficients, using the update operators defined in (12) or (13), at every level of the forward-wavelet transform of U, V, and N, and store them at each level.
3. Compute the inverse transform but instead of adding the detail coefficients (which were not computed at the previous step) add the approximation coefficients which were stored. At each step of the inverse transform, going from coarse to fine, divide the approximation interpolated from the previous (coarser) level by a factor of two before adding the stored approximation coefficients (thus implementing the factor $2^j$ in (11)). Compute this for the transformed U, V, and N, computed at the previous step. Repeat this to compute $\overline{U}$, $\overline{V}$ and $\overline{N}$ as defined by (11).
4. Compute the normalized output color components $\hat{U}(x, y)=\overline{U}(x,y)/\overline{N}(x,y)$ and $\hat{V}(x,y)=\overline{V}(x,y)/\overline{N}(x,y)$. The final image is given by Y, $\hat{U}$, $\hat{V}$. In this application we do not use the weights defined by (5), but rather the following exponential weights, used in [Levin et al. 2004], $$w_n^j[m]=e^{-(d^j[n]-d^j[m])^2/\sigma^2} \quad (14)$$

Figure 8A:
FIGS. 8c to 8f compare prior art edge-preserving gradients obtained from inputs shown in FIGS. 8a and 8b with corresponding results of example embodiments of the present disclosure.
FIGS. 8g to 8i show respectively an edge-avoidingly smoothed normalization function $\bar{N}$, an edge-avoidingly smoothed user input $\bar{U}$ and the resulting normalized edge-avoidingly smoothed user input $\hat{U}$ i.e. $\bar{U}|\bar{N}$.
Figure 8B:
Figure 8C:
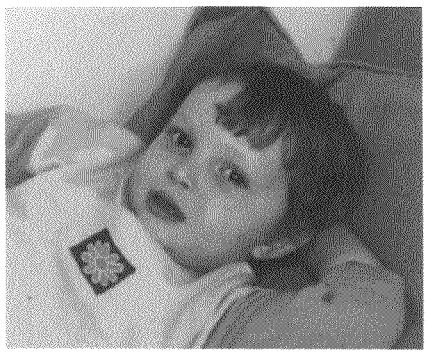
Figure 8D:
Figure 8E:
Figure 8F:
Figure 8G:
Figure 8H:
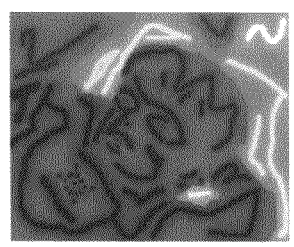
Figure 8I:

FIGS. 8a and 8b show a pair of input images and user color strokes; FIGS. 8c and 8d show results produced by Levin et al. [2004], and FIGS. 8e and 8f show the results using WRB wavelets according to example embodiments of the present disclosure (with $\sigma^2$=15). FIGS. 8g to 8i show respectively $\overline{N}$, $\overline{U}$ and the resulting $\hat{U}$. The images are surprisingly close to one another with mean-squared errors below $4 \times 10^{-4}$ (for image values ranging between zero and one). Since there are about four transforms involved, it takes our scheme 50 milliseconds to colorize a one-megapixel image. Solving the inhomogeneous Laplace equation, resulting in [Levin et al. 2004], using the preconditioning proposed by Szeliski [2006], takes about 2 seconds for setting up the matrices and another 1.5 seconds for performing each preconditioned conjugate-gradient iteration. Szeliski showed that one iteration is enough to obtain reasonable results, but this still involves an almost two orders of magnitude time factor compared to what is required here.

Figure 9A:
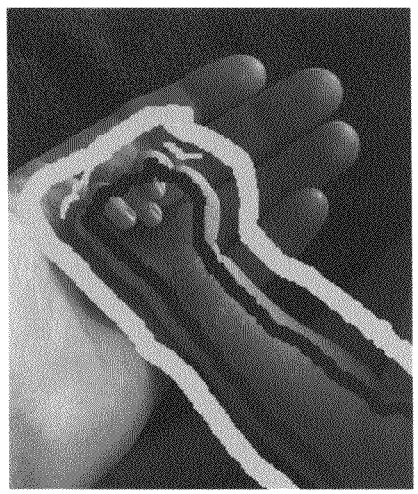
FIGS. 9a and 9b show a different application using a selective decolorization.
Figure 9B:

FIGS. 9a and 9b show a slightly different application, a selective decolorization, where given an input color image, the user indicates regions which it is desired to turn to grayscale and the ones to remain colored. These user strokes define a function C(x, y) which is zero and one respectively and a normalization function N(x, y) which is one wherever the user has clicked and zero otherwise. We compute C, exactly as we did above (with σ2=15), and use it to modulate the chrominance components, i.e., we compute the output image by $\hat{C}(x, y)U(x, y)$ and $\hat{C}(x, y)V(x, y)$ and the unchanged luma Y(x, y).

Thus, there is provided in accordance with example embodiments of the present disclosure a new family of second-generation wavelets constructed using robust data-prediction lifting schemes. These new wavelets adapt to the edge content of the image and avoid having, in their support, pixels from both sides of an edge. This achieves a multi-scale decomposition which decorrelates data better than the common linear translation-invariant multi-resolution analyses. This nonlinear perfect-reconstructing data-dependent filtering is computed in linear time, as is typical to LTI filtering. We showed that this multi-scale representation can be used to process the transformed variables, without taking special precautions, and result in halo-free image. The fact that the new MRA encodes the image edge structure allowed us to derive an edge-aware interpolation scheme that achieves, through fast and explicit computation, results traditionally obtained by implicit formulations requiring sophisticated linear solver.

The results we presented show that the image quality we obtain, with EAW-based processing, is comparable to the ones produced by recent state-of-the-art methods. Inheriting the lifting scheme's fast performance, the EAW transform allows us to accelerate various computational photography applications by a factor of more than one order of magnitude, thus achieving multi-scale data-dependent filtering at running times typical to LTI wavelet computations.

The approach we propose here combines two successful methodologies, robust smoothing and the lifting scheme, to achieve a conceptually new, simple, and natural scheme for performing multiscale data-dependent analysis and processing. One of the practical benefits of this elementariness is the algorithmic simplicity and straightforward programming required to implement the lifting-based transformation and the processing based on it.

Figure 10A:
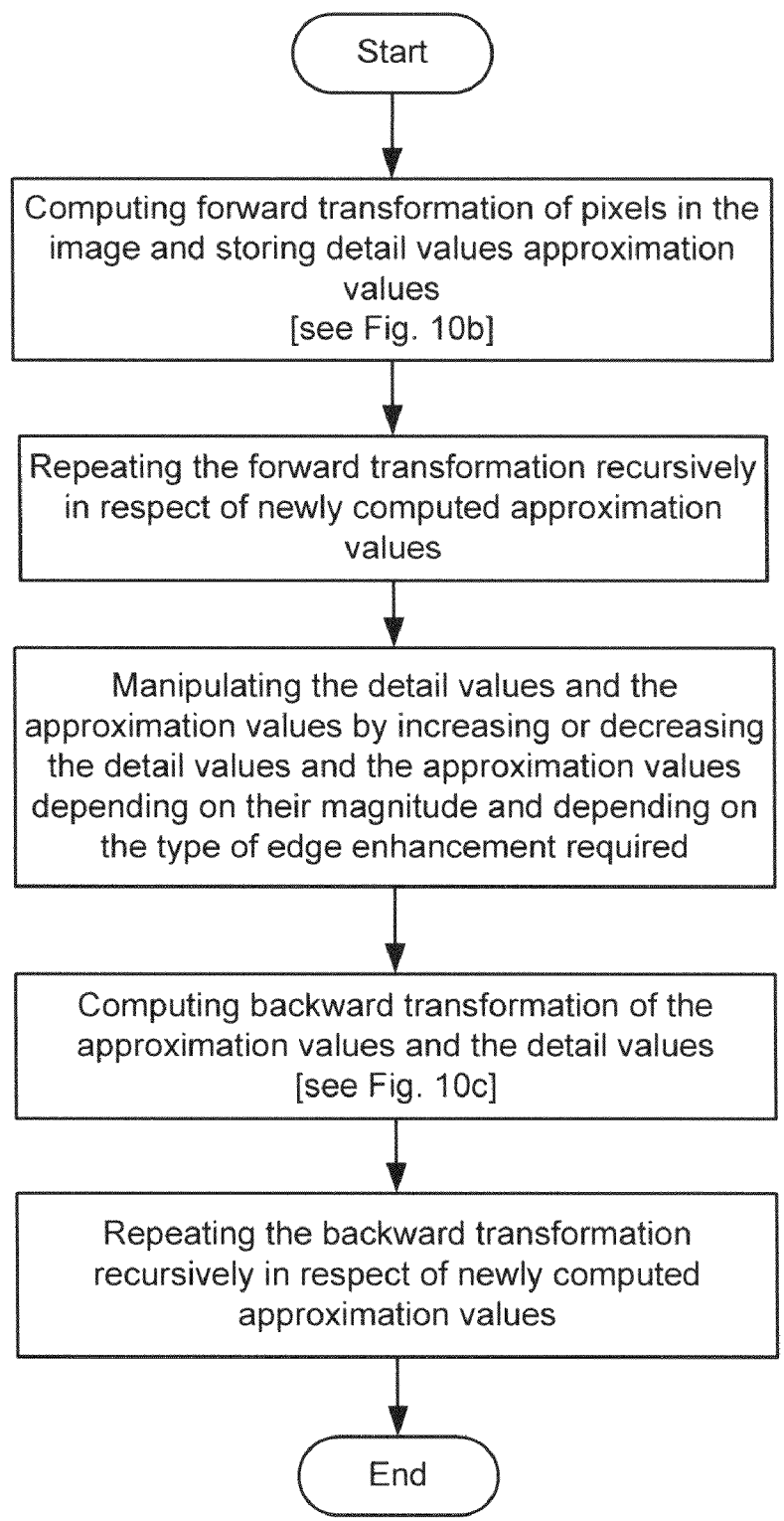
FIGS. 10a to 10c are example flow diagrams showing the principal operations carried out by a method according to example embodiments of the present disclosure.
Figure 10B:
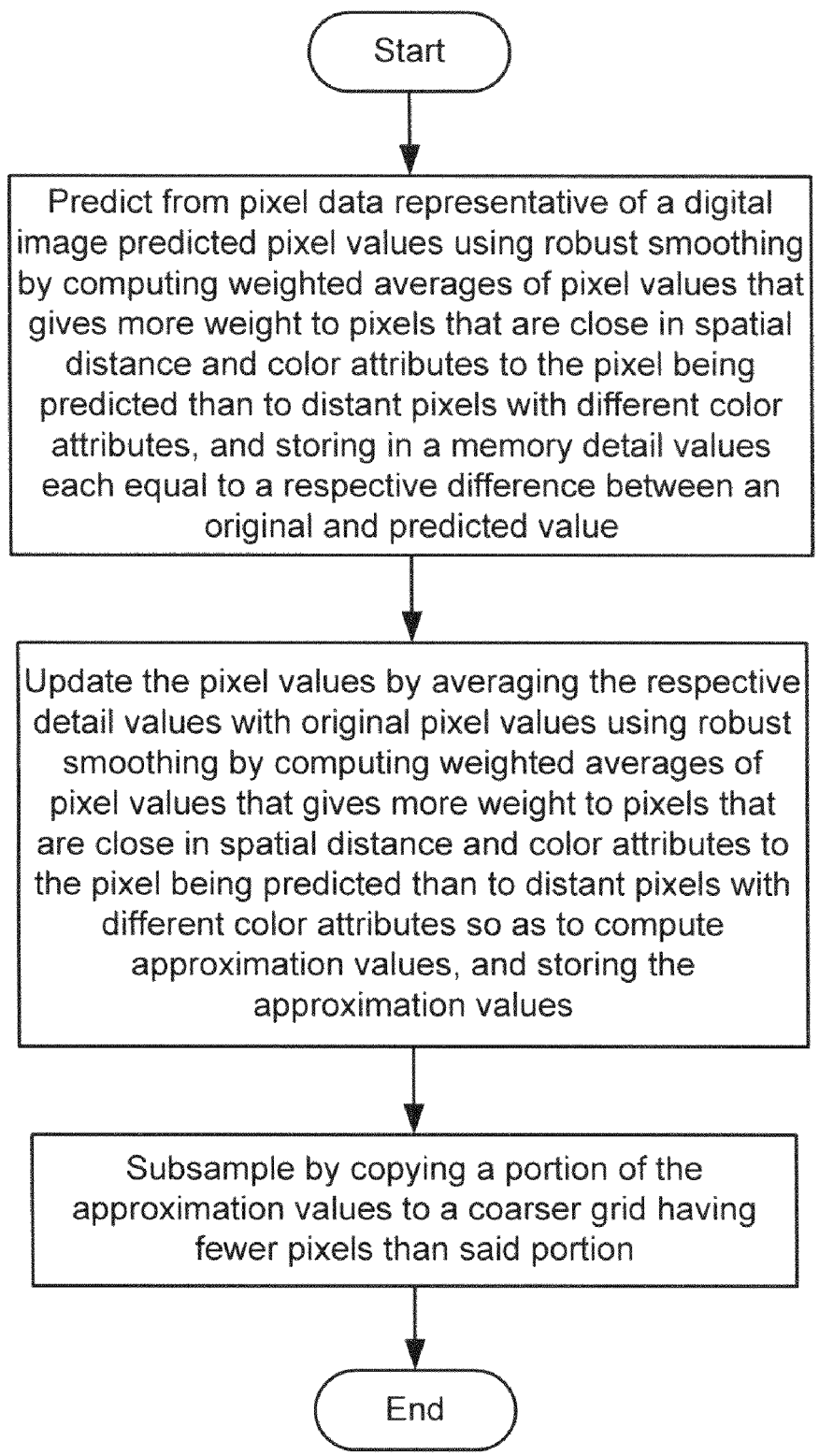
Figure 10C:
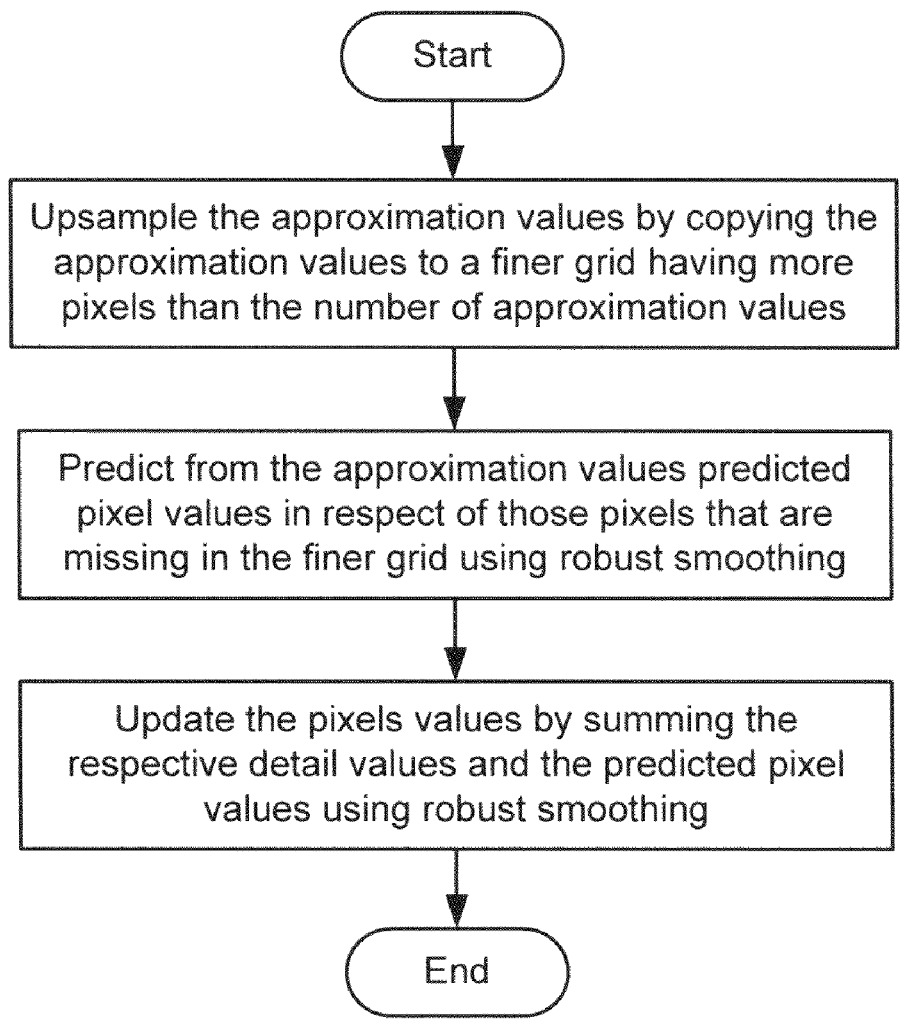

FIGS. 10a to 10c are flow diagrams showing the principal operations carried out by a method according to example embodiments of the present disclosure for performing any one or more of edge-preserving image sharpening, edge-preserving image smoothing, edge-preserving image dynamic range compression, and edge-aware data interpolation on digital images. Broadly, the method comprises iteratively computing forward transformation of pixels in the image so as to derive detail values and approximating values, manipulating the detail values and the approximation values, and iteratively computing backward transformation of the approximation values and the detail values.

Forward transformation of pixels is performed by predicting predicted pixel values using robust smoothing by computing weighted averages of pixel values that gives more weight to pixels that are close in spatial distance and color attributes to the pixel being predicted than to distant pixels with different color attributes. Detail values, each equal to a respective difference between an original and predicted value, are stored in memory. The pixel values are updated by averaging the respective detail values with original pixel values using robust smoothing by computing weighted averages of pixel values that gives more weight to pixels that are close in spatial distance and color attributes to the pixel being predicted than to distant pixels with different color attributes so as to compute approximation values, which are likewise stored. The approximation values are subsampled by copying a portion of the approximation values to a coarser grid having fewer pixels than the portion, and the forward transformation is repeated recursively in respect of newly computed approximation values.

The manipulation increases or decreases the detail values and the approximation values depending on their magnitude and depending on whether edge-preserving image sharpening or edge-preserving image smoothing or edge-preserving image dynamic range compression or edge-aware data interpolation is to be performed.

The backward transformation of the approximation values and the detail values includes upsampling the approximation values by copying the approximation values to a finer grid having more pixels than the number of approximation values, predicting from the approximation values predicted pixel values in respect of those pixels that are missing in the finer grid using robust smoothing, and updating the pixels values by summing the respective detail values and the predicted pixel values using robust smoothing. The backward transformation is repeated recursively in respect of newly computed approximation values.

Figure 11:
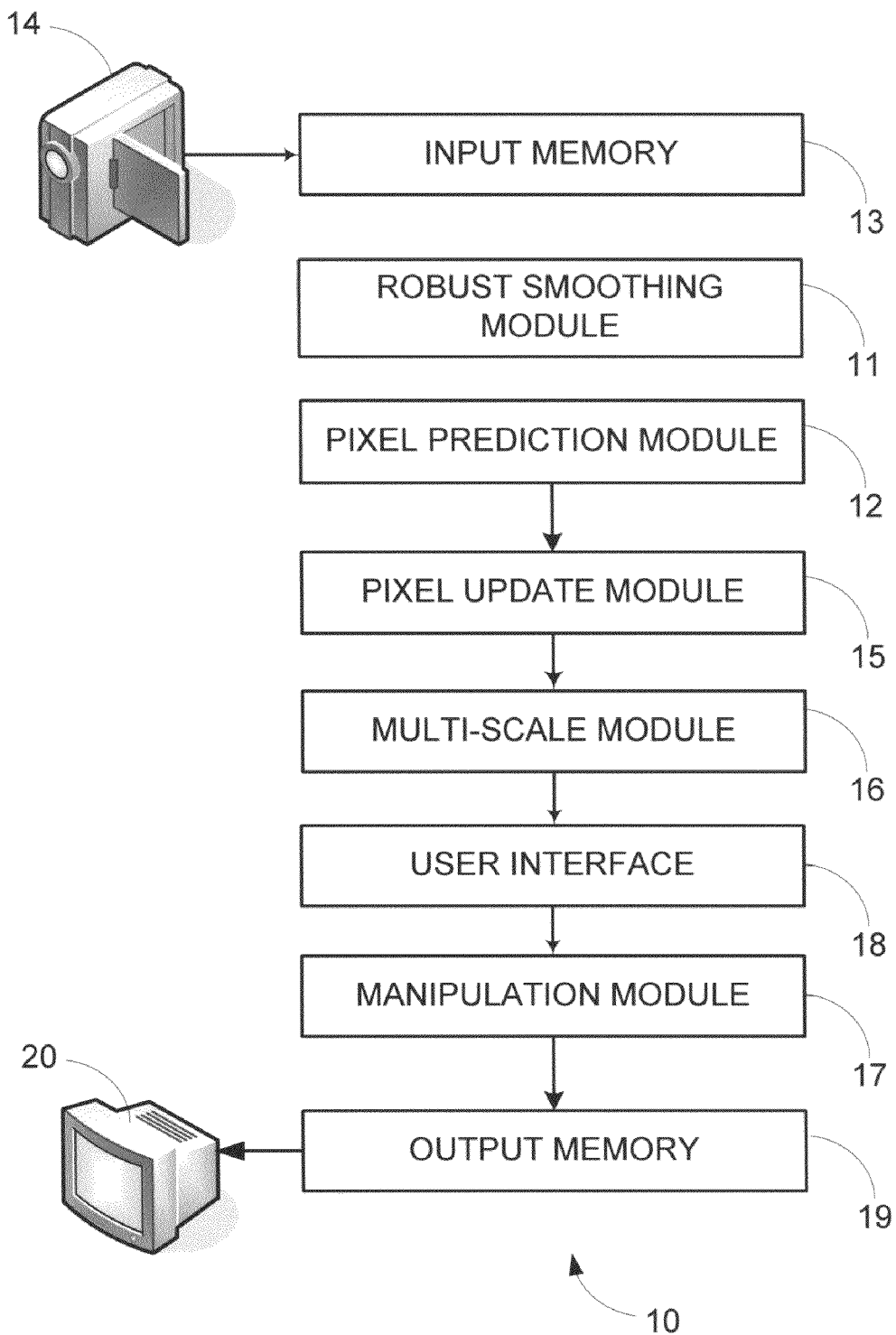
FIG. 11 is an example block diagram showing functionality of a system according to example embodiments of the present disclosure.

FIG. 11 is a block diagram showing functionality of a system 10 according to example embodiments of the present disclosure for performing any one or more of edge-preserving image sharpening, edge-preserving image smoothing, edge-preserving image dynamic range compression, and edge-aware data interpolation scheme on digital images. The system 10 comprises a robust smoothing module 11 configured to compute weighted averages of pixel values that gives more weight to pixels that are close in spatial distance and color attributes to the pixel being predicted than to distant pixels with different color attributes. A pixel prediction module 12 is coupled to the robust smoothing module 11 and is adapted for coupling to an input memory 13 storing pixel data representative of a digital image and configured to extract from the image smoothed predicted pixel values using robust smoothing, and to store in the input memory 13 a respective difference detail value equal to the difference between respective original and predicted values. The image data in the input memory 13 is typically provided by a digital camera 14, which may be a still or video camera. Alternatively, the image data may be derived by digitizing an image formed using any other suitable approach, as known in the art.

A pixel update module 15 is coupled to the robust smoothing module 11 and to the pixel prediction module 12 and is configured to compute approximation values by averaging the difference respective detail values with original pixel values using robust smoothing, and to store the new approximation values. A multi-scale module 16 runs the prediction and update modules recursively by operating on the resulting approximation values, and a manipulation module 17 coupled to the multi-scale module 16 increases or decreases the detail and approximation values depending on their magnitude and depending on whether edge-preserving image sharpening or edge-preserving image smoothing or edge-preserving image dynamic range compression or edge-aware data interpolation is to be performed.

In some embodiments, there may be provided a user interface 18 for selecting a mode of edge enhancement. In this case, the manipulation module 17 is coupled to the interface 18 and is responsive to the user selection for operating in such a manner to yield the selected mode of edge enhancement. In other embodiments, the system 10 may be pre-configured to carry out only one predetermined mode of edge enhancement.

Enhanced pixel data are stored in an output memory 19 for subsequent rendering by a rendering unit 20, which is typically a display device or plotter or printer. In such case, the rendering unit 20 is coupled to the output memory 19 either directly or remotely, for example, via a communications network such as a LAN or the Internet. However, the techniques of the present disclosure are also of benefit in post-processing edge-enhanced image data, particularly in order to extract information the accuracy of which is critically dependent on the edge being well-defined. In such case, the output memory 19 stores the digitally-enhanced data and may be used as an input to an auxiliary processor.

It will likewise be appreciated that the input memory 13 may be integral with the system or may be external thereto. For example, the input memory 13 could be part of the digital camera 14, such as a memory card, that is then coupled to the system 10 for effecting edge-enhancement prior to printing. However, in the case that the input memory 13 is part of the system, the input memory 13 and the output memory 19 may be realized by a common memory module. Techniques of the present disclosure also contemplate that either or both of the input memory 13 and the output memory 19 may be part of, or associated with, an external server for external access by the system 10.

It will be understood that a system according to example embodiments of the present disclosure may be a suitably programmed general purpose or special purpose computer or computing system. Likewise, example embodiments contemplate a computer program being readable by a computer or computing system for executing methods and/or techniques of the present disclosure. Example embodiments further contemplate a machine-readable memory or storage medium tangibly embodying a program of instructions executable by the machine for executing the methods and/or techniques of the present disclosure.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/202,022, filed Jan. 21, 2009, are incorporated herein by reference, in their entirety.

From the foregoing it will be appreciated that, although specific to embodiments have been described herein for purposes of illustration, various modifications may be made without deviating from the spirit and scope of the present disclosure. For example, the methods, systems, and techniques discussed herein are applicable to other architectures. Also, the methods, systems and techniques discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computing system for performing any one or more of edge-preserving image sharpening, edge-preserving image smoothing, edge-preserving image dynamic range compression, and edge-aware data interpolation on digital images, the system comprising:
   a computing processor; and
   one or more modules, executed by the computing processor, configured to perform forward transformations and backward transformations by performing a method comprising:
      computing forward transformation of pixels in said image by:
         predicting from pixel data representative of a digital image predicted pixel values using robust smoothing by computing weighted averages of pixel values that gives more weight to pixels that are close in spatial distance and color attributes to the pixel being predicted than to distant pixels with different color attributes, and storing in a memory detail values each equal to a respective difference between an original and predicted value;

updating pixel values by averaging the respective detail values with original pixel values using robust smoothing by computing weighted averages of pixel values that gives more weight to pixels that are close in spatial distance and color attributes to the pixel being predicted than to distant pixels with different color attributes so as to compute approximation values, and storing the approximation values; and subsampling by copying a portion of the approximation values to a coarser grid having fewer pixels than said portion;

repeating the forward transformation recursively using the newly computed approximation values as original pixel values;

increasing or decreasing the detail values and the approximation values depending on their magnitude and depending on whether edge-preserving image sharpening or edge-preserving image smoothing or edge-preserving image dynamic range compression or edge-aware data interpolation is to be performed;

computing backward transformation of the approximation values and the detail values by:

upsampling the approximation values by copying the approximation values to a finer grid having more pixels than the number of approximation values;

predicting from the approximation values predicted pixel values using those pixels that are missing in the finer grid using robust smoothing; and updating pixels values by summing the respective detail values and the predicted pixel values using robust smoothing; and repeating the backward transformation recursively using the newly computed approximation values as the approximation values.

2. The system according to claim 1, further comprising: an attenuation module, executed by the computing processor, configured to decrease detail values or increase the approximation values at each scale depending on their magnitude, or scale, or location in the image.

3. The system according to claim 1, further comprising: an amplification module, executed by the computing processor, configured to increase the detail values or decrease the approximation values at each scale depending on their magnitude, or scale, or location in the image.

4. The system according to claim 1, further comprising: an amplification module, executed by the computing processor, configured to operate on high-dynamic range images and increase the detail values or decrease the approximation values at each scale depending on their magnitude, or scale, or location in the image.

5. The system according to claim 1, further comprising:

an attenuation module, executed by the computing processor, configured to decrease the detail values or increase the approximation values at each scale depending on their magnitude, or scale, or location in the image;

an interpolation module, executed by the computing processor, configured to apply the attenuation module to multiple images and divide the images pixel-wise;

an auxiliary forward transformation module, executed by the computing processor, configured to sequentially apply forward transformations to any given averaging weight; and an auxiliary backward transformation module, executed by the computing processor, configured to sequentially apply backward transformations to any given averaging weight.

6. The system according to claim 1, further comprising: a rendering module coupled to a memory, executed by the computing processor, and configured to render an enhanced image.

7. The system according to claim 1, further comprising: a user interface for allowing user selection of a mode of edge enhancement, to allow the one or more modules to operate in such a manner as to yield the selected mode of edge enhancement.

8. A computer-implemented method for performing any one or more of edge-preserving image sharpening, edge-preserving image smoothing, edge-preserving image dynamic range compression, and edge-aware data interpolation on digital images, the method comprising:

computing forward transformation of pixels in said image by:

predicting from pixel data representative of a digital image predicted pixel values using robust smoothing by computing weighted averages of pixel values that gives more weight to pixels that are close in spatial distance and color attributes to the pixel being predicted than to distant pixels with different color attributes, and storing in a memory detail values each equal to a respective difference between an original and predicted value;

updating pixel values by averaging the respective detail values with original pixel values using robust smoothing by computing weighted averages of pixel values that gives more weight to pixels that are close in spatial distance and color attributes to the pixel being predicted than to distant pixels with different color attributes so as to compute approximation values, and storing the approximation values; and subsampling by copying a portion of the approximation values to a coarser grid having fewer pixels than said portion;

repeating the forward transformation recursively using the newly computed approximation values as original pixel values;

increasing or decreasing the detail values and the approximation values depending on their magnitude and depending on whether edge-preserving image sharpening or edge-preserving image smoothing or edge-preserving image dynamic range compression or edge-aware data interpolation is to be performed;

computing backward transformation of the approximation values and the detail values by:

upsampling the approximation values by copying the approximation values to a finer grid having more pixels than the number of approximation values;

predicting from the approximation values predicted pixel values using those pixels that are missing in the finer grid using robust smoothing; and updating pixels values by summing the respective detail values and the predicted pixel values using robust smoothing; and repeating the backward transformation recursively using the newly computed approximation values as the approximation values.

9. The method according to claim 8 when used to perform edge-preserving smoothing including decreasing the detail values or increasing the approximation values at each scale depending on their magnitude, or scale, or location in the image.

10. The method according to claim 8, when used to perform edge-preserving sharpening including increasing the detail values or decreasing the approximation values at each scale depending on their magnitude, or scale, or location in the image.

11. The method according to claim 8, when used to perform edge-preserving high-dynamic range compression including operating on high-dynamic range images and increasing the detail values or decreasing the approximation values at each scale depending on their magnitude, or scale, or location in the image.

12. The method according to claim 8, when used to perform edge-aware interpolation between pixels values in a first digital image according to pixel values in a second digital image, including:
   computing said forward transformation of pixels in the first digital image and storing the respective weights used in said weighted averages;
   computing said forward transformation of pixels in the second digital image using weights in the first digital image;
   decreasing the detail values in the first digital image or increasing the approximation values in the first digital image at each scale depending on their magnitude, or scale, or location in the in the first digital image; and
   computing said backward transformation of pixels in the second digital image using weights in the first digital image.

13. A computer-implemented program storage device readable by machine, tangibly embodying a program of instructions executable by the machine to perform a method for performing any one or more of edge-preserving image sharpening, edge-preserving image smoothing, edge-preserving image dynamic range compression, and edge-aware data interpolation on digital images, the method comprising:
   computing forward transformation of pixels in said image by:
      predicting from pixel data representative of a digital image predicted pixel values using robust smoothing by computing weighted averages of pixel values that gives more weight to pixels that are close in spatial distance and color attributes to the pixel being predicted than to distant pixels with different color attributes, and storing in a memory detail values each equal to a respective difference between an original and predicted value;
      updating pixel values by averaging the respective detail values with original pixel values using robust smoothing by computing weighted averages of pixel values that gives more weight to pixels that are close in spatial distance and color attributes to the pixel being predicted than to distant pixels with different color attributes so as to compute approximation values, and storing the approximation values; and
      subsampling by copying a portion of the approximation values to a coarser grid having fewer pixels than said portion;
   repeating the forward transformation recursively using the newly computed approximation values as original pixel values;
   increasing or decreasing the detail values and the approximation values depending on their magnitude and depending on whether edge-preserving image sharpening or edge-preserving image smoothing or edge-preserving image dynamic range compression or edge-aware data interpolation is to be performed;
   computing backward transformation of the approximation values and the detail values by:
      upsampling the approximation values by copying the approximation values to a finer grid having more pixels than the number of approximation values;
      predicting from the approximation values predicted pixel values using those pixels that are missing in the finer grid using robust smoothing; and
      updating pixels values by summing the respective detail values and the predicted pixel values using robust smoothing; and
   repeating the backward transformation recursively using the newly computed approximation values as the approximation values.

* * * * *